Nov. 22, 1938.  R. S. RANKIN  2,137,966
SEWAGE SYSTEM
Filed March 12, 1935  4 Sheets-Sheet 1

INVENTOR.
RENVILLE S. RANKIN
BY
ATTORNEY.

Nov. 22, 1938.    R. S. RANKIN    2,137,966
SEWAGE SYSTEM
Filed March 12, 1935    4 Sheets-Sheet 2
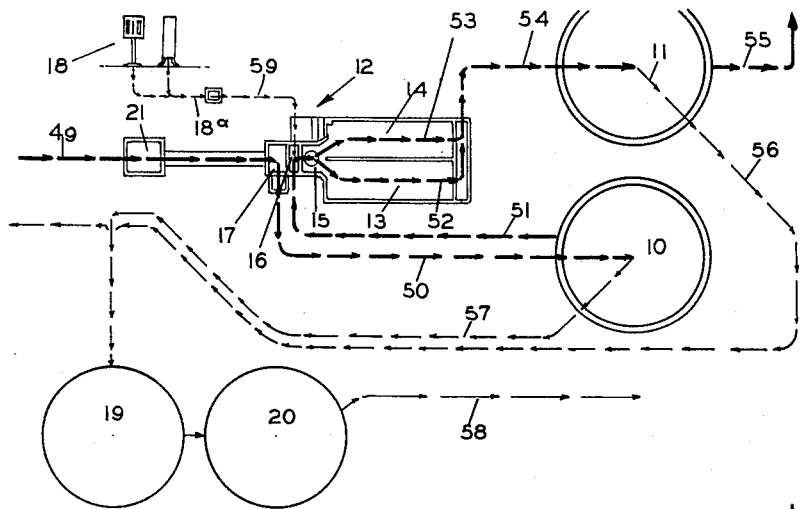
FIG. 4.
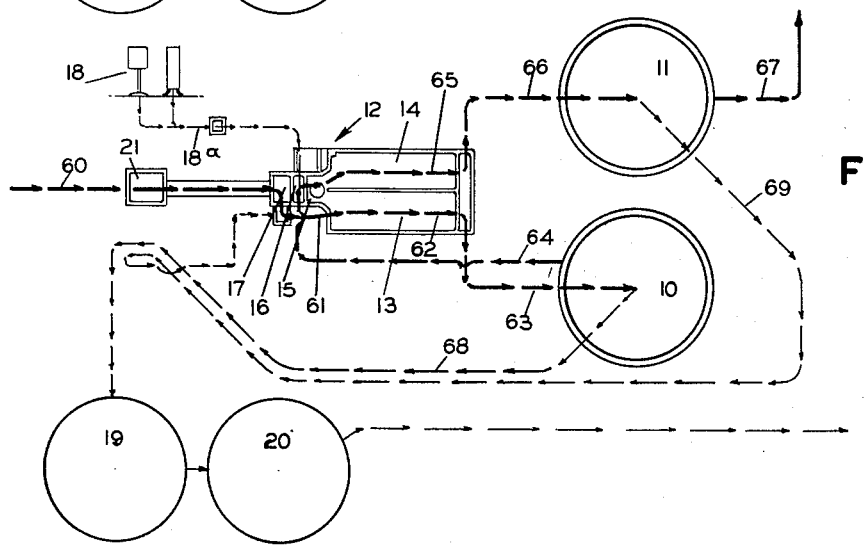
FIG. 5.
FIG. 9.
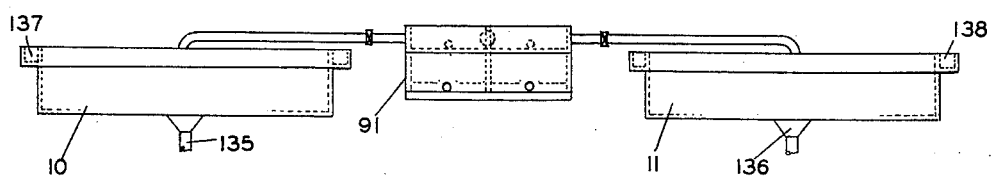
INVENTOR.
RENVILLE S. RANKIN
BY Austin Middleton
ATTORNEY.

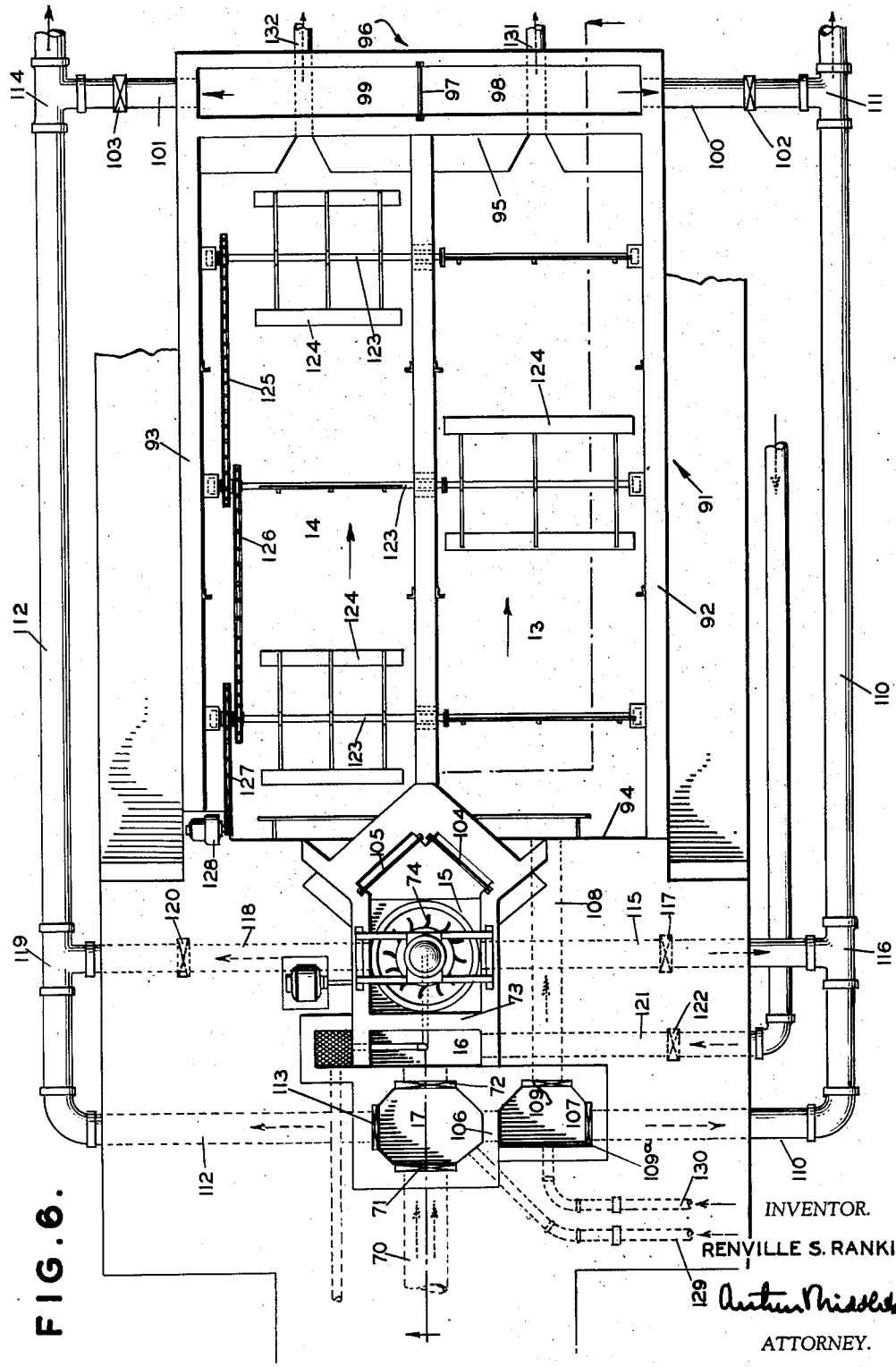

Nov. 22, 1938.　　　R. S. RANKIN　　　2,137,966
SEWAGE SYSTEM
Filed March 12, 1935　　　4 Sheets-Sheet 4

INVENTOR.
RENVILLE S. RANKIN
BY Arthur Middleton
ATTORNEY.

Patented Nov. 22, 1938

2,137,966

UNITED STATES PATENT OFFICE 2,137,966

SEWAGE SYSTEM

Renville S. Rankin, Chicago, Ill., assignor to The Dorr Company, Inc., New York, N. Y., a corporation of Delaware Application March 12, 1935, Serial No. 10,660

14 Claims. (Cl. 210—2)

This invention relates to a clarification and treatment system for the removal of suspended solids from liquids. More particularly it relates to improvements in the operation and arrangement of the system with regard to potential operating changes in response to certain varying demands.

With regard to its field of application this invention relates preferably, although not exclusively, to sewage treatment, or more specifically to improvements in a clarifying system for sewage treatment in which periodic operating changes are desired in view of certain requirements of flexibility, economy, and other plant operating principles, and also in view of such demands as made upon the sewage plant according to seasonal conditions and fluctuations.

To understand a difficulty in the case of sewage clarification, according to one aspect a problem exists in the layout of sewage plants, which has to do with the fact that, as a rule, there is a scantiness of hydraulic head between the point of raw sewage supply and the lowest possible clarifier overflow elevation, so that a desired gravity flow to and from the clarifiers can often only be obtained by a very close margin. In a tentative example the upper limitation of the head available may be determined by a long approach from the respective municipality which the sewage plant serves, while the lower limit might be controlled by the respective water levels of a stream or body of water into which the clarifier overflow is to discharge.

Consequently, in this respect this invention contemplates having a battery of clarifiers changeable from parallel to series operation. Parallel operation can be satisfied with a smaller margin of head with both clarifiers arranged on or for operating at substantially the same level. Series operation of the clarifiers requires additional head to compensate for the necessary drop between the primary and secondary clarifiers.

Another reason to account for the preference underlying this invention of having the clarifiers in the sewage plant arrangeable for parallel and for series operation respectively, lies in a requirement for chemically dosing the sewage preferably at certain points of the flowsheet. Such dosing may comprise the addition of a chemical precipitating agent at certain seasons of the year. That is to say, when dosing is required, as for instance during the summer months, it is preferred to interpose such dosing step between a primary and a secondary clarifier, therefore series operation of the clarifiers is desired at such time. This specific method of dosing is advocated because it is economical in the use of coagulating or precipitating agents and is preferable in certain instances to the dosing of the raw sewage at a point ahead of the clarifiers. During the winter months and otherwise however it may be desirable to omit the dosing step, and substitute operation of the clarifiers in parallel instead of series.

Also certain requirements with regard to the subsequent treatment by digestion of the respective clarifier sludges have a bearing upon the preference of dosing between clarifier stages, inasmuch as this makes a substantial percentage of undosed clarifier sludge available for subsequent digestion.

Objects of the invention are to produce a clarification plant, or clarification section of a plant, or sewage treatment plant, which is flexible in operation, which is economical in dosing and power requirements and in total operating efficiency, which is optionally operable in parallel and series respectively preferably at a minimum total of hydraulic head, and which altogether is simple to operate in view of changing operating requirements. To this end the invention contemplates the arrangement of a pair of clarifiers at substantially equal overflow levels and thus adapted for parallel operation, in combination with pressure boosting means operative to make up for the head loss when switching the clarifiers from parallel to series, and preferably inoperative when returning to parallel operation.

One feature therefore proposes an arrangement according to which a liquid supply channel has interposed in a portion thereof a rotary mixing device of the type which has sufficient centrifugal effect to act as a low lift pump.

This feature can therefore be said to reside in the selective use of a combined mixing device and low lift pump in a flow sheet which is alternately operable with clarifiers parallel or in series.

Other features relate to a system of interconnections between the respective operating points of the clarification or treatment plant for selectively effecting a desired variety of operating changes.

Other features revolve around the details of structural arrangement and operation of a liquid conditioning and flocculating unit to be used in connection with the present clarification system.

Still other features relate to the type and specific arrangement of a low pressure pumping means for boosting gravity flow in a liquid clarification system, or to the use for this purpose of what is known and may be referred to as a "turbo-mixer" or "turbo flash-mixer".

A preferred embodiment therefore in a sewage treatment plant, while simple, compact, and otherwise capable of meeting the various prime requirements set forth above, permits variant modes of operation; with selective use of the clarifiers, flocculating devices, mixing chamber, mixing device, and various auxiliary channels.

That is to say, with parallel connection of the clarifiers the clarification plant is selectively operable: with or without dosing in the mixing device, or with or without a flocculating step following the mixing step.

The advantages derived from the foregoing flexible arrangement are not confined to the operation of the clarification section proper but extend their benefit further into the subsequent step of digesting the clarifier sludge, because the arrangement in a broader aspect also involves the mixing of raw primary sludge with chemically precipitated secondary sludge, which for the purpose of digestion is considered preferable to digesting sludge which has been wholly precipitated chemically.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

In particular there are possible within the scope of this invention a variety of operating combinations not enumerated above, such variety being covered by the appended description, claims, and drawings.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which:

Fig. 4 is a diagram showing series operation of the clarifiers, and connections arranged to include the flocculating unit intermediate the clarifiers.

Fig. 5 is a diagram showing the clarifiers in series with one flocculator section ahead of the first clarifier, and the other flocculating section intermediate the clarifiers.

Fig. 6 is an enlarged plan view of the conditioning and flocculating unit including premixing and distributing chambers.

Fig. 9 is an end view upon the flocculating tank and the clarifier tanks associated therewith.

Figure 1:
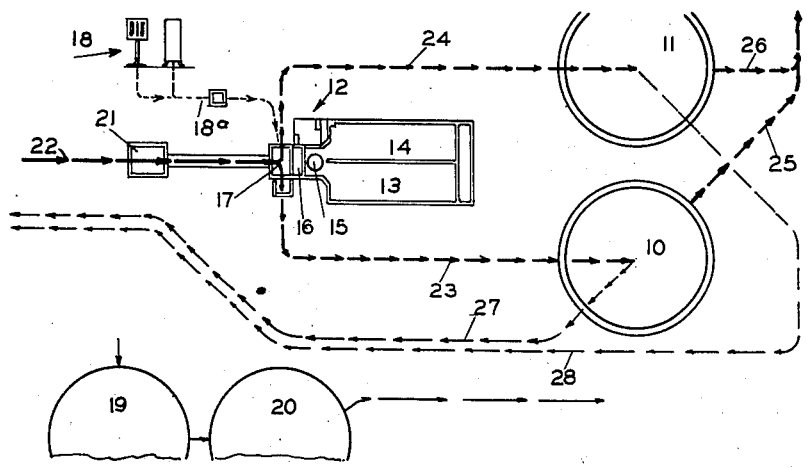
Fig. 1 is a diagram showing parallel operation of the clarifiers, with connections active to by-pass the flocculating unit.

Figures 1 to 5 show flowsheets disclosing diagrammatically a variety of operating connections which may be selectively established in a preferred clarification or treatment system according to this invention. The system includes as operating elements: A pair of mechanically cleaned clarifiers 10 and 11; a liquid conditioning and flocculating unit collectively indicated by the numeral 12, and comprising a pair of individual flocculating sections or units 13 and 14; a conditioning or mixing chamber or unit 15 associated with the influent end of the flocculating units; a receiving chamber 16 for the mixing chamber; and a control chamber or arrangement 17 equipped for selective feed distribution to various sections of the system.

The numeral 18 indicates an auxiliary arrangement for dispensing a coagulating or precipitating agent or chemical; 18a a feed line therefor jointly comprising a device for causing coagulating precipitable solids in the liquid. At 19 and 20 is shown a battery of sewage digesters. Numeral 21 may indicate a screening chamber for removal of roughage.

The respective operating connections in the diagrams are shown in the way of arrowed lines, the arrows indicating the flow direction in the lines.

More specifically, Fig. 1 includes an influent line 22 leading into the control chamber 17, direct feed connections 23 and 24 from the control chamber 17 to the clarifiers 10 and 11 respectively, overflow lines 25 and 26 from the clarifiers. The numerals 27 and 28 indicate the respective clarifier underflow or sludge lines.

Figure 2:
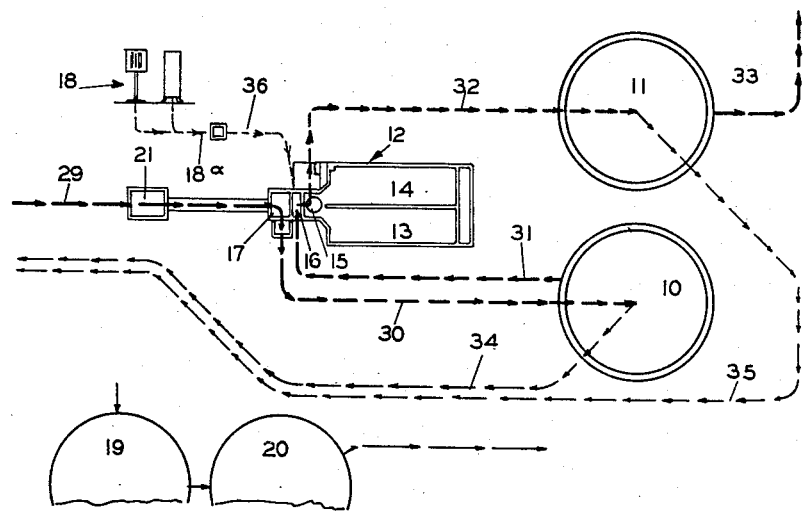
Fig. 2 is a diagram showing series operation of the clarifiers, with connections active to by-pass the flocculating unit.

In Fig. 2, an influent line 29 leads into the control chamber 17, continuing into a feed line 30 to the clarifier 10. An overflow line 31 from clarifier 10 leads into the receiving chamber 16 and the flow continues through the mixing chamber 15 into a feed line 32 leading therefrom to the second clarifier 11 from which leads an overflow line 33. Respective clarifier underflow lines 34 and 35 are indicated to lead from the respective clarifiers 10 and 11. Arrows 36 leading from the dispensing arrangement 18 indicate that the line 18a in this flowsheet is active to introduce a chemical precipitating agent.

Figure 3:
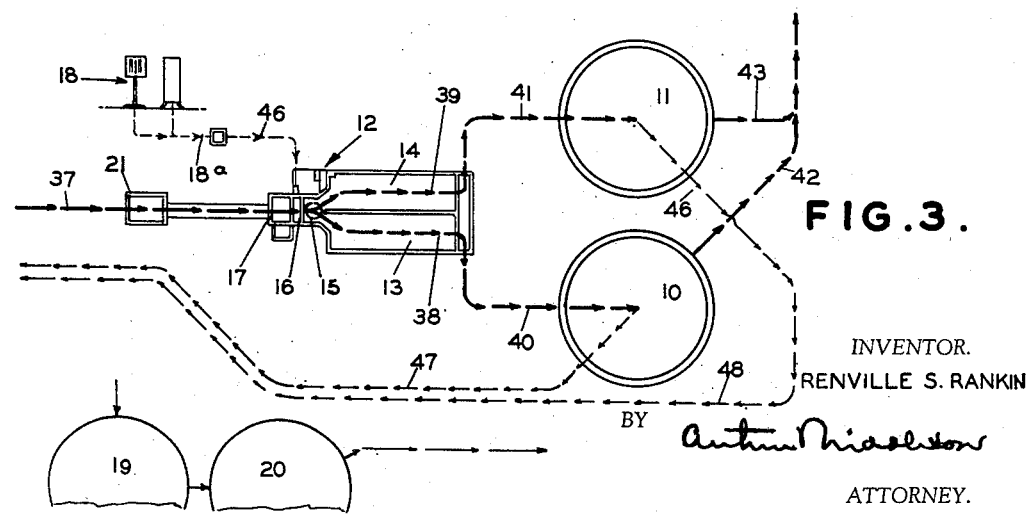
Fig. 3 is a diagram showing parallel operation of the clarifiers, with connections arranged to include the flocculator unit.

In Fig. 3 the influent 37 splits in the mixing chamber 15, to allow the split portions to continue individually through the flocculating units 13 and 14 as indicated by the respective lines 38 and 39. Corresponding connections 40 and 41 lead from the flocculating units to the respective clarifiers 10 and 11. Clarifier overflows are shown at 42 and 43. Arrows 46 leading from the dispensing arrangement 18 indicate that the line 18a in this flowsheet is active to introduce a chemical coagulating agent ahead of mixer 16 and flocculating devices 12, 13. Clarifier underflows are shown at 47 and 48 respectively.

Fig. 4 has an influent 49 passing through the control chamber 17, to continue into the feed line 50 to clarifier 10. An overflow line 51 leads from the clarifier 10 to the receiving chamber 16 and to the mixing chamber 15 where the flow splits to enter into the two flocculating sections 13 and 14 respectively, the split portions being indicated at 52 and 53. Discharges from both flocculating sections combine in the line 54 to feed the clarifier from which overflow leaves at 55. Underflow from clarifier 11 is shown at 56 to lead away, while an underflow or sludge line 57 from clarifier 10 enters the digesters 19 and 20 respectively in series, digester discharge being indicated at 58. Arrows 59 leading from the dispensing arrangement 18 indicate the introduction of a chemical coagulating agent.

Fig. 5 has influent 60 pass through the control chamber 17, by-passing the mixing chamber 15 as by a line 61 to continue into the one flocculating unit 13 as indicated by the line 62. A feed connection 63 then leads from the flocculating unit 13 to the clarifier 10. An overflow line 64 from the clarifier leads back through the receiving chamber 16, to continue via the mixing chamber 15 into the second flocculating unit or section 14 as indicated by the line 65. A feed connection 66 from there leads to the second clarifier 11 from which overflow 67 flows away. An underflow line 68 from clarifier 10 leads to the first digester or digestion treatment stage 19, while a line 69 carries underflow from clarifier 11 to the point of raw feed for recirculation.

Figure 7:
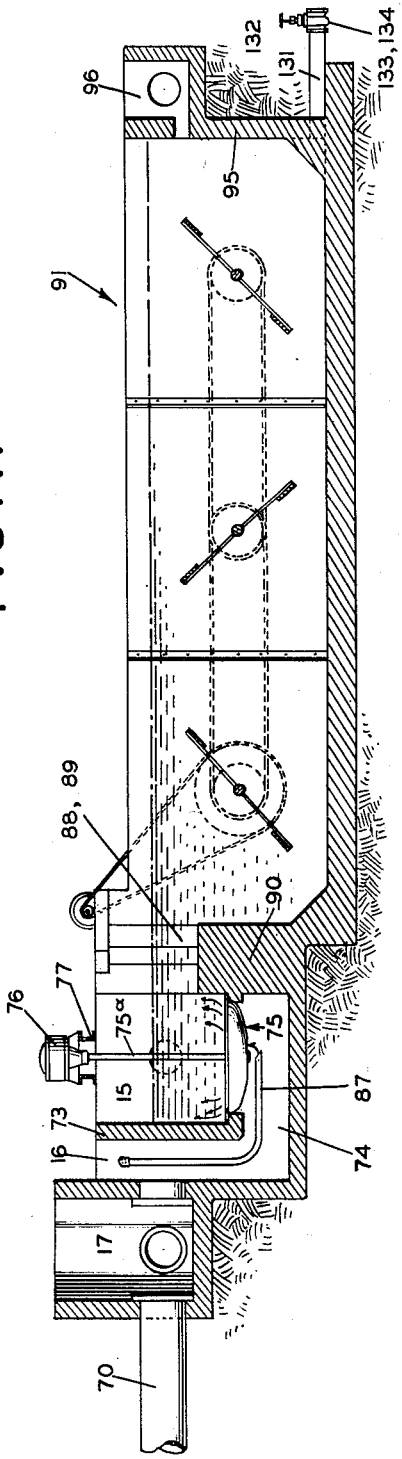
Fig. 7 is a longitudinal section of the conditioning and flocculating unit, taken upon Fig. 6.
Figure 8:
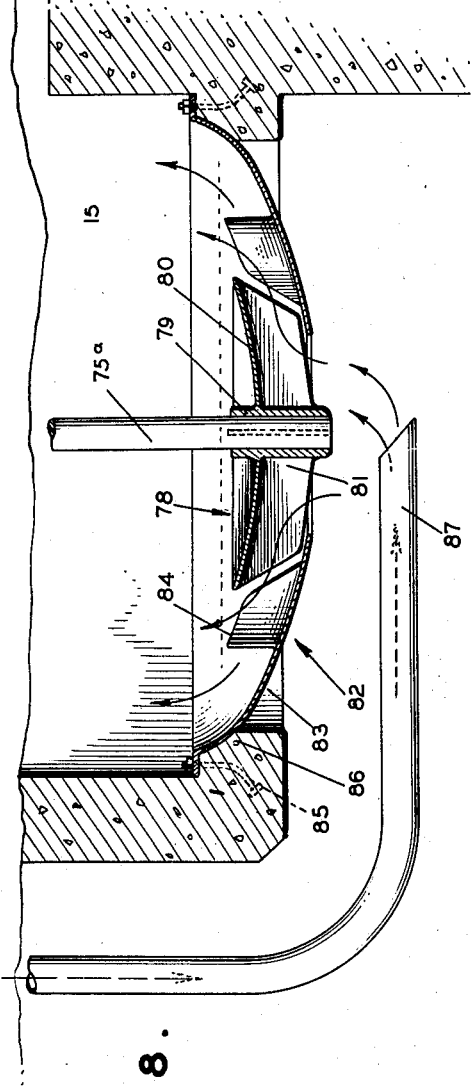
Fig. 8 is an enlarged detail section of the combined mixing and low pressure pumping device.

The enlarged detail of the conditioning and flocculating unit 12 with suitable pipe connections for selective modes of operation is shown substantially in Fig. 6 and Fig. 7. An influent pipe 70 leads through a gate or valve 71 into the control chamber 17, mentioned above. Another gate, valve or closure means 72 leads from the control chamber 17 into the receiving chamber 16 which is separated through a wall 73 from the mixing chamber 15 (see Fig. 7). A passage 74 underneath the wall 73 leads into the mixing chamber in which is provided a rotary mixing device 75 such as a turbo-mixer shown in the further enlarged detail section of Fig. 8.

The agitator or mixing device may comprise a vertical impeller shaft 75a is supported and rotated from a drive or motor unit 76 shown to be mounted on beams or channel irons 77, (see Fig. 7). At its lower end the vertical shaft 75a carries a rotor or impeller 78, (see Fig. 8) which is shown to consist of a hub 79 carrying a disc 80, which has extending freely downwardly therefrom radial impeller blades 81. A substantially annular stator 82 surrounds the impeller 78, and which consists of a dished annular member 83, having freely extending therefrom a set of stator blades 84 to guide the liquid ejected from the impeller blades. The annular dished member 83 is shown to be seated and anchored by bolts 85 upon a ledge 86 protruding from the walls of the mixing chamber 15. It is noted that, with the exposed blades 81 and 84 extending freely in their respective directions, the movement of liquid through the impeller device is effected under relatively little loss of head on the one hand, while causing a low pressure hydraulic boost on the other hand. With these impeller- and guide-blades being open or exposed as they are, the walls of the mixing chamber in fact form the housing for this impeller- or low-lift pumping device which otherwise is known of itself. In other words, the walls of the mixing chamber or section, which may also be called a rising channel, section or column, can be said to constitute in connection with the stator, the pressure chamber of the impeller device; or it can be said that the stator 82 is associated with the chamber 15 in such a manner as to form a constriction thereof for the passage therethrough of the liquid being mixed and lifted.

A pipe 87 terminating underneath the impeller device serves for the introduction of conditioning or flocculating agents into the liquid stream to obtain what is known as a flash mixing effect when the stream thus dosed is drawn through the impeller device.

In Fig. 6 direct passages or passageways or transitions 88 or 89 respectively lead from the mixing chamber 15 over a submerged wall portion 90 into the respective sections 13 and 14 of a flocculating tank 91 defined by the side walls 92 and 93, the influent end 94, the effluent end 95 having an effluent launder 96. A removable partition 97 divides the launder into two sections 98 and 99. Effluent pipes 100 and 101 lead from the respective ends of the launder and have closure valves 102 and 103 respectively. A pair of sluice gates 104 and 105 control the influent from the mixing chamber 15 into the respective flocculating sections 13 and 14.

The control chamber 17 is connected through a passage 106 with an auxiliary chamber 107 from which a connection 108 having valve or closure means 109 leads into flocculating section 13, by-passing the receiving chamber 16 and the mixing chamber 15. Through a valve 109a, a connection or pipe 110 leads from the auxiliary chamber 107 to the clarifier 10 (not shown in Fig. 6), and forms at 111 a junction with the effluent pipe 100 from the flocculator tank.

A corresponding connection or pipe 112 from the control chamber 17 is provided with a valve 113 and leads to a junction 114 with the flocculator effluent pipe 101 and on to the second clarifier 11 (not shown in Fig. 6). A connection 115 leads from the mixing chamber 15 to a point of junction 116 with the pipe 110, a valve 117 being inserted in the connection 115. Another corresponding connection 118 leads from the mixing chamber 15 to a point of junction 119 with the pipe 112, a valve 120 being inserted in the connection 118. A pipe 121 having a gate or valve 122 is shown to lead into the receiving chamber 16, which pipe constitutes the connection carrying overflow from the clarifier 10 (not shown in Fig. 6).

A horizontal sequence of transverse paddle-like assemblies of paddle shafts 123 carries blades or paddles 124 for the flocculation units 13 and 14, to move or rotate about horizontal axes in repetitive paths. The shafts are shown to be driven by a set of chains 125, 126, 127 and corresponding sprockets, and a motor or driving unit 128.

At 129 and 130 respectively, in Fig. 6 there are indicated pipe connections for the return or recirculation of clarifier sludge or the like.

Numerals 131 and 132 in Fig. 7 indicate drain connections for the flocculation sections having valves 133 and 134.

In Fig. 9 the numerals 135 and 136 indicate the underflow or sludge outlet connections from the respective clarifiers 10 and 11. 137 and 138 indicate the respective overflow launders of the clarifiers 10 and 11.

*Operation*

When operating the system with connections established according to the diagram of Fig. 1 and for parallel operation of the clarifiers 10 and 11, the gates or valves 72 and 109, 102 and 103, and 117 and 120 and 122 are closed. Raw feed or sewage 22 continually enters the control chamber 17 through gate 71, where it splits into portions one of which passes through passage 106 into the auxiliary chamber 107 and from there through a gate 109a into the pipe or conduit 110 leading to feed the clarifier tank 10, the other portion of the split up leaving the control chamber 17 through gate 113 to feed through pipe or conduit 112 the other clarifier tank 11. The flocculating unit is thus completely by-passed. Clarifier overflows 25 and 26 respectively may flow to a joint disposal. Clarifier underflows or sludge discharges may also conjointly lead away. The chemical dispensing arrangement 18 in this set-up is shown to be inactive although its use is optional. The operating arrangement established according to Fig. 1 may serve at times when no special treatment is needed in the way of flocculating a dosed or undosed sewage.

The arrangement of Fig. 1 may be modified when it is desired to use a chemical coagulant and the mixing device 75, by closing the valves 109a and 113 and opening the valve 72 as well as the valves 117 and 120, while maintaining gates 104 and 105 towards the flocculation zone closed, and starting the mixer 75 going while adding the chemical through pipe 87 from the dispensing device 18 with the clarifier sludge lines 27 and 28 leading away.

When operating the system with connections established according to diagram Fig. 2 for series operation of the clarifiers 10 and 11, the gates 104 and 105 remain closed to block entrance into the flocculating devices 12, 13; valve 113 is closed and so are valves 72 and 117. Valves 102 and 103 remain closed. Valve 122 in pipe 121 is now open and active together with valve 120 in pipe 118. Consequently, raw feed 29 may enter through open main gate 71 into the control chamber 17, through passage 106 into the auxiliary chamber 107, and through open gate 109a into the conduit 110 through which it feeds the clarifier 10 which now becomes a primary clarifier. Overflow from this clarifier, briefly called primary overflow, enters the conduit 121 which brings it through open valve 122 into the receiving chamber 16 when a chemical coagulant or precipitation agent may be introduced through pipe 87 prior to entering the mixer 75 in the mixing chamber 15. At this stage the mixer effects a quick vigorous mixing or flash mixing while simultaneously inducing a low pressure pumping effect upon the liquid, which pressure compensates for the drop or head loss incurred in the primary overflow, and which will cause the liquid to enter pipe or conduit 118 with valve 120 open, and through conduit 112 will feed the clarifier 11 which now becomes the secondary clarifier.

The reason for the drop or head loss incurred through transfer from primary to secondary clarifier is illustrated in Fig. 9 which makes it clear that while both clarifier overflows are on equal level in the case of parallel operation, the loss occurs when changing to series operation and the primary overflow drops into the overflow launder of the primary clarifier 10 from where it must be lifted again to the feed level of the secondary clarifier 11.

A series operation as described in connection with Fig. 2 is desirable for instance during certain summer months when it is desired to apply an economical and practical dosing method such as dosing the second stage, in order to effect a greater purity of the clarifier effluent in view of the low water of the natural streams into which the clarifiers may discharge and the greater putrefying tendencies concurrent with summer temperatures.

The diagram according to Fig. 3 again suggests parallel operation of the clarifiers 10 and 11, advancing over the setup of Fig. 1 by the use of subsequent flocculation. Therefore, valves 109a and 113, 122, 117 and 120 and 122 are closed while flow is permitted to pass through valves 71 and 72, gates 104 and 105, and valves 102 and 103. Consequently, raw feed 37 may enter into the control chamber 17, pass on into the receiving chamber 16, and through the submerged passage 74 via the mixing device 75 into the mixing chamber 15. The dosing pipe 87 may now be active discharging a coagulating agent into the flow of liquid prior to entering the flash mixing phase of the mixer, such dosing being indicated by the arrows 46 in the dosing feed line 18a of Fig. 3. Now the liquid is ready for effective flocculation of the suspended solids when the flow splits to enter and pass through the respective flocculating sections 13 and 14 by way of open gates 104 and 105. The removable partition 97 in the overflow launder 96 of the flocculating apparatus may now be effective to receive the individual overflows from the sections 13 and 14 in individual launder sections 98 and 99 so that the proper proportion of the total flow may reach each respective clarifier 10 and 11 by way of pipes 100 and 101 through the open valves 102 and 103 therein.

The clarifier overflows 42 and 43 may conjointly lead away to disposal. The clarifier underflows 47 and 48, both containing chemically precipitated sludge, are in this case shown to be led away to suitable disposal.

In other words, the operating arrangement of Fig. 3 affords increased purity of clarifier overflow irrespective of underflow or sludge treatment. It is understood that with both clarifiers discharging dosed precipitate the character of the sludge thus obtained is not preferable for the process of digestion.

The operation according to Fig. 4 answers the demand for a highly purified clarifier overflow and a clarifier sludge of such characteristics as to be suited for the process of digestion. Consequently, this flowsheet suggests series operation of the clarifiers 10 and 11, coagulating and flocculation of the secondary stage, and the use of undosed primary clarifier underflow or sludge in the digesters 19 and 20, as well as digesting undosed primary sludge together with dosed secondary sludge.

Consequently, the operating set up in Fig. 4 is as follows: The valves 113 and 72, and 109 are closed. Closed are also the valves 117 and 120 leading from the mixing chamber 15, and the valve 102 in pipe 100 leading from the flocculation apparatus launder 98. Open is the valve 109a from the auxiliary control chamber 107, open the valve 122 in pipe 121 leading into the receiving chamber 16, and open are the gates 104 and 105 into the flocculation tank. Open is the flocculation apparatus discharge valve 103 leading to the secondary clarifier 11. The partition 97 is assumed to be removed from the flocculation device launder 96.

Influent 49 enters the control chamber 17, and through the auxiliary chamber 107 with the valve 109a open into the pipe 110, which carries the sewage to the primary clarifier 10 from which settled raw sludge becomes available for digestion in the digesters 19 and 20 when led thereto through underflow line 57 (see Fig. 4). Overflow from the primary clarifier passes through pipe 121 into the receiving chamber 16, and on through the submerged passage 74 via the mixer into the mixing chamber 15. The mixer then of course exercises its additional function of boosting the pressure head compensating for the drop incurred in the primary overflow. Again, arrows 59 in the dosing supply line 18a indicate that a flocculant enters the liquid through pipe 87 below the mixer. The liquid thus conditioned splits to enter through gates 104 and 105 and flow through the flocculating sections 13 and 14 of the flocculation tank 91 where the solids in the conditioned liquid undergo a process of flocculation or coalescence in preparation for a more effective subsequent sedimentation. Effluent from both flocculation sections combines in the effluent launder 96 with the partition 97 removed, and through conduit 101 and valve 103 reaches the terminal section of the conduit 112 and thus to feed the secondary clarifier 11 from where overflow 55 and sludge discharge 56 may be disposed of in suitable ways as by leading all or a desirable part thereof through the connection 56a into the digester 19 to be digested therein together with the primary sludge from the line 57.

The operation according to Fig. 5 involves a further refinement, in that it affords secondary stage dosing for chemical precipitation, independent flocculation for each clarifier stage, as well as far-reaching clarifier sludge ultilization in the digesters as well as for recirculation purposes.

Consequently, the set-up requires that valves 109a, 113 and 72, 117 and 118 and the gate 104 be closed, while valves 109, 102, 122, the gate 105, and valve 103 be open. Effluent 60 then passes through the control chamber 17 and the auxiliary chamber 107, and through valve 109 via the by-pass conduit 108 through the first flocculation section 13 where solids are flocculated and made settleable by the peculiar agitation influence of the flocculating paddles 124. Assuming the removable partition 97 to be inserted in the flocculation device effluent launder 96, the liquid treated in the flocculation section 13 may leave through the launder section 98 via the effluent pipe 100 and valve 102, in order to feed the primary clarifier 10 after passing through the terminal section of the pipe conduit 110.

Overflow 64 from the primary clarifier 10 passes by way of pipe 121 and valve 122 into the receiving chamber 16 in preparation for its secondary coagulation and sedimentation step. That is to say, the liquid after passing through the submerged passage 74 may now again be dosed with a chemical coagulant through the dosing pipe 87, with arrows in the dosing feed line 18a indicating that the line is active in this respect. The dosed liquid by reason of the boosting effect of the mixer 75 is drawn into the mixing chamber 15, the boosting pressure being sufficient to insure compensation of the head loss incurred in the primary clarifier overflow and to cause the flow of liquid to pass through open gate 105 and through the second flocculation section 14 and to reach the secondary clarifier 11 by way of effluent pipe 101 and the terminal section of the pipe 112 (not shown in Fig. 6). Overflow from the secondary clarifier 11 may leave through 67 to suitable disposal. Underflow or sludge from the secondary clarifier may advantageously be utilized for recirculation or redistribution within the plant as by reintroducing it into the control chamber 17 or the auxiliary chamber 107, via the pipes 129 and 130 respectively.

A divisional patent application has been filed by me on December 18, 1937, covering subject matter carved from this patent.

I claim:

1. A clarification system for the removal of suspended solids from flowing liquids, and equipped for conditioning of the liquid preparatory to sedimentation, which system comprises a raw liquid supply, a pair of clarifiers substantially arranged at an elevation for parallel operation, means for selectively conducting liquid from said raw liquid supply to said clarifiers so that under one set of selected conditions the clarifiers are arranged in parallel and so that under another set of selected conditions said clarifiers are arranged in series whereby they function as associated primary and secondary clarifiers, said means comprising a mixing section arranged to receive liquid obtained from said raw liquid supply and wherein the liquid received therein can be subjected to a conditioning operation, and a mixing device in said mixing section, which said device includes impeller means surrounded by the walls of said mixing section in a manner to substantially form a housing for the impeller means, said impeller means being effective to boost the hydraulic head of the liquid passing through said mixing section, said means when arranged for series operation being arranged to have said mixing chamber interposed between the primary and the secondary clarifier to effect efficient mixing of any added conditioning material and of the primary clarifier overflow at a place ahead of the secondary clarifier, said mixing device also being effective to supply sufficient hydraulic head to ensure the transfer of liquid from the primary to the secondary clarifier.

2. A clarification system according to claim 1, characterized by the including of an agitating section for effecting flocculation of the solids in the conditioned liquid, and by the further fact (a) that said means when selectively set for parallel operation of the clarifiers have controls for selectively conducting the liquid from the point of raw liquid supply consecutively through the mixing section and past the mixing device and thence through said flocculating section, and (b) that there are controls whereby the volume of the flocculated liquid is split for subsequent parallel treatment of the component volumes in said clarifiers.

3. A clarification system according to claim 1, characterized by the addition of an agitating section to effect flocculation of the solids in the liquid, and by the fact that with the clarifiers operating in series the agitating section is operatively interposed in the flow connection leading from the mixing section to the secondary clarifier, and by the further fact that operating means are provided for selectively by-passing said agitating section.

4. A clarification system according to claim 1, characterized by the addition of an agitating section to effect flocculation of the solids in the liquid, and by the fact that with the clarifiers operating in series the agitating section is operatively interposed in the flow connection leading from the mixing section to the secondary clarifier, and by the further fact that operating means are provided for selectively by-passing said agitating section and said mixing section.

5. A clarification system according to claim 1, characterized by the addition of an agitating section for the purpose of flocculating the solids in the liquid, which section comprises a pair of flocculating units adapted for parallel operation, and also characterized by the fact that connections and controls therefor are provided, selectively operable to include one flocculating unit in the flow connection between the raw liquid supply and the primary clarifier, and to include the second flocculating unit in the flow connection between the mixing section and the secondary clarifier.

6. A liquid clarification plant, comprising a raw liquid supply; a clarifying section, including a pair of clarifiers; a liquid conditioning and flocculating section, including a flocculating unit and an impeller mixer having hydraulic lifting power, and closure means selectively operable between flocculating unit and mixer; a feed connection from the flocculating unit to each clarifier, and individual selectively operable closure means for each connection; a by-pass connection between said liquid supply and each clarifier, and closure means associated therewith selectively operable to eliminate the flocculating unit; an overflow return conduit between one clarifier and said liquid supply, and selectively operable closure means associated with said return conduit; all of said connections and closure means selectively operable in such coordination as to effect changes of operation substantially as described.

7. A liquid clarification plant according to claim 6, with the addition of a by-pass connection and selectively operable closure means therefor, arranged between the raw liquid supply and the flocculating unit for selectively eliminating the mixer.

8. A liquid clarification plant according to claim 6, in which the raw liquid supply comprises a control chamber ahead of the mixer for selectively directing feed to desired points of the plant.

9. A liquid clarification plant according to claim 6, in which the raw liquid supply comprises a control chamber ahead of the mixer for selectively directing feed to desired points of the plant, and with the addition of an intermediate receiving chamber interconnecting the control chamber and the mixer and adapted for receiving overflow through said overflow return conduit from said clarifier.

10. A liquid clarification plant according to claim 6, in which the flocculating unit comprises a pair of independently operable units, and with the addition of individual closure means selectively operable between said mixer and the respective flocculating units.

11. A liquid treatment apparatus, which comprises a mixing section adapted to have liquid flow substantially upward therethrough, a rotary combined mixing and hydraulic pressure-imparting device therein adapted to have a submerged pressure discharge and which is effective to maintain above said device in the conditioning section a zone of relatively increased pressure head; and a subsequent treatment section in horizontal sequence to said conditioning section and adapted to have said liquid flow thereto by way of direct hydraulic communication.

12. In a liquid treatment apparatus having a liquid supply and having a liquid mixing section, and in horizontal sequence to the latter a subsequent treatment section to receive liquid therefrom, said mixing adapted for substantially upward flow therethrough of said liquid and continued flow by way of hydraulic communication into said flocculating section; an impeller device including a rotor and a stator element interposed in the path of the liquid which must pass upwardly through said mixing section and adapted to effect combined mixing and hydraulic lifting of the liquid passing through the apparatus, said rotor element comprising a substantially horizontally-extending rotary disc member and radial blades extending downwardly therefrom, said stator comprising a substantially horizontally-extending annulus and radial blades rising therefrom; said impeller device adapted to have a submerged pressure discharge and to be effective to maintain in said mixing section a zone of relatively-increased hydraulic head at the delivery side of the device as compared with a relatively lower hydraulic head at the inlet side thereof.

13. In a liquid treatment apparatus having a liquid supply, and having a liquid mixing section and a subsequent treatment section to receive liquid therefrom, said section adapted for substantially upward flow therethrough of said liquid and continued flow by way of hydraulic communication into said treatment section; an impeller device interposed in the upward path of the liquid through said mixing section and adapted to have a submerged pressure discharge and to effect combined mixing and hydraulic lifting of the liquid passing through the unit, said impeller device comprising a rotor revolving about a substantially vertical axis, and a stator surrounding the same and which is associated with the surrounding walls of said rising portion so as to form a constriction thereof for the passage therethrough of the liquid being mixed and lifted, said impeller device, by its operation, being effective to maintain in said mixing section a zone of relatively-increased hydraulic head at the delivery side of the device as compared with a relatively lower hydraulic head at the opposite side thereof.

14. In a liquid clarification system, an apparatus combination which comprises a liquid distributing section, a liquid supply therefor, a liquid dosing section, a controlled outlet connection leading from said distributing section, a controlled connection between said distributing section and said dosing section, a pumping pressure section, a pumping device between said dosing section and said pressure section and through which there exists hydraulic communication between the pumping and the dosing sections, a controlled outlet connection from said pumping pressure section, and a controlled separate inlet connection as distinguished from said controlled connection between the distributing section and the dosing section, leading into said dosing section.

RENVILLE S. RANKIN.